United States Patent [19]

Wise et al.

[11] Patent Number: 5,505,897

[45] Date of Patent: Apr. 9, 1996

[54] METHOD FOR FORMING A PIPE

[75] Inventors: John Wise; Larry L. Martin, both of Hamilton, Ohio

[73] Assignee: Advanced Drainage Systems, Inc., Columbus, Ohio

[21] Appl. No.: 224,553

[22] Filed: Apr. 7, 1994

[51] Int. Cl.⁶ .......................... B29C 47/90; B29C 53/58
[52] U.S. Cl. .................. 264/565; 156/195; 264/177.17; 264/558; 264/560; 425/378.1; 425/380
[58] Field of Search ................... 264/177.1, 177.17, 264/564, 565, 560, 568, 558; 156/195; 425/380, 377, 467, 378.1, 464, DIG. 60

[56] References Cited

U.S. PATENT DOCUMENTS

| | | | |
|---|---|---|---|
| 2,451,986 | 10/1948 | Slaughter | 264/177.17 X |
| 3,274,315 | 9/1966 | Kawamura | 264/563 |
| 3,907,961 | 9/1975 | Carrow | 264/565 X |
| 3,917,500 | 11/1975 | Petzetakis et al. | 156/195 |
| 4,510,004 | 4/1985 | Hawerkamp | 156/195 X |
| 5,261,988 | 11/1993 | Dikis et al. | 156/195 X |

Primary Examiner—Michael W. Ball
Assistant Examiner—David W. Reed
Attorney, Agent, or Firm—Biebel & French

[57] ABSTRACT

A method for manufacturing plastic pipe such that the pipe has apertures formed therein when the pipe is viewed in cross-section, comprising the steps of having hot plastic flow through a die and subsequently be extruded through a die head to form an extruded wall component having first and second end walls, with the die head having formed therein a plurality of first sized gaps and a plurality of second sized gaps, with the second sized gaps having an aperture located inside each of said second sized gaps. The die is secured to a manifold assembly, with the manifold assembly comprising sets of tubes located centrally of one another, each set of tubes comprising a water inlet tube, a tube through which a vacuum is pulled, and a water return tube. Each set of tubes is positioned longitudinally within a respective die manifold tube with the outermost surface of each set of tubes spaced a first distance from the respective die manifold tube. Each of the respective die manifold tubes extends through the die.

4 Claims, 7 Drawing Sheets

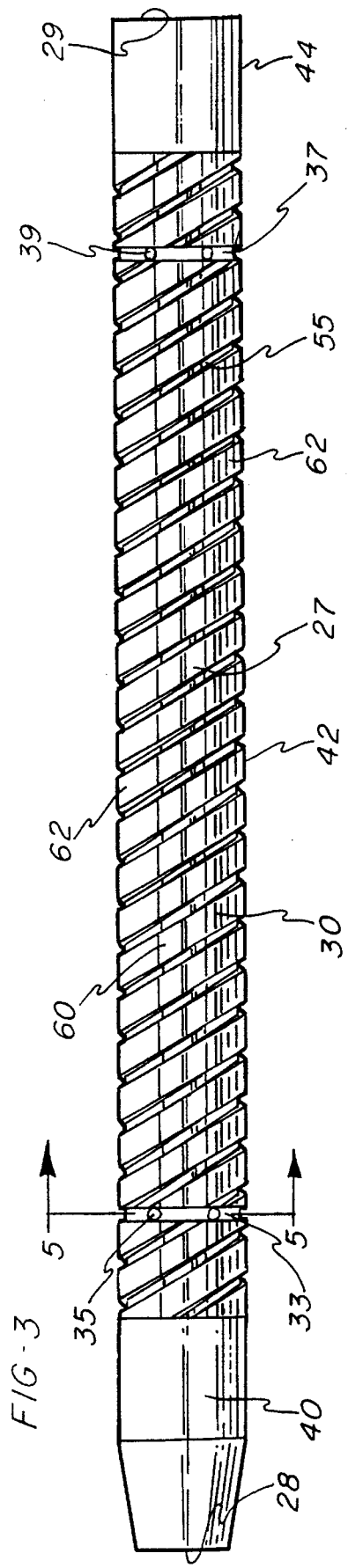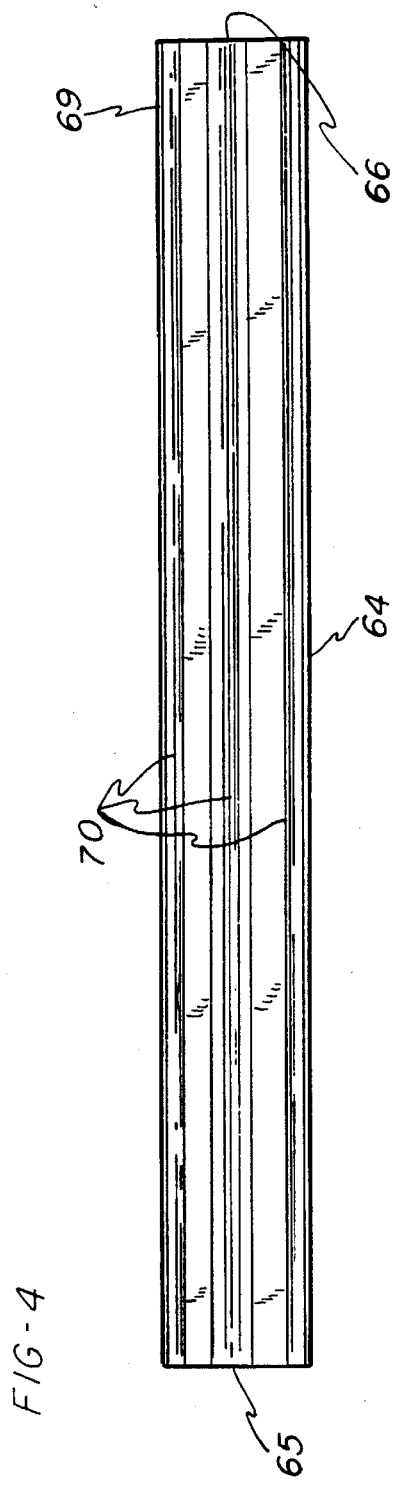
FIG-3
FIG-4

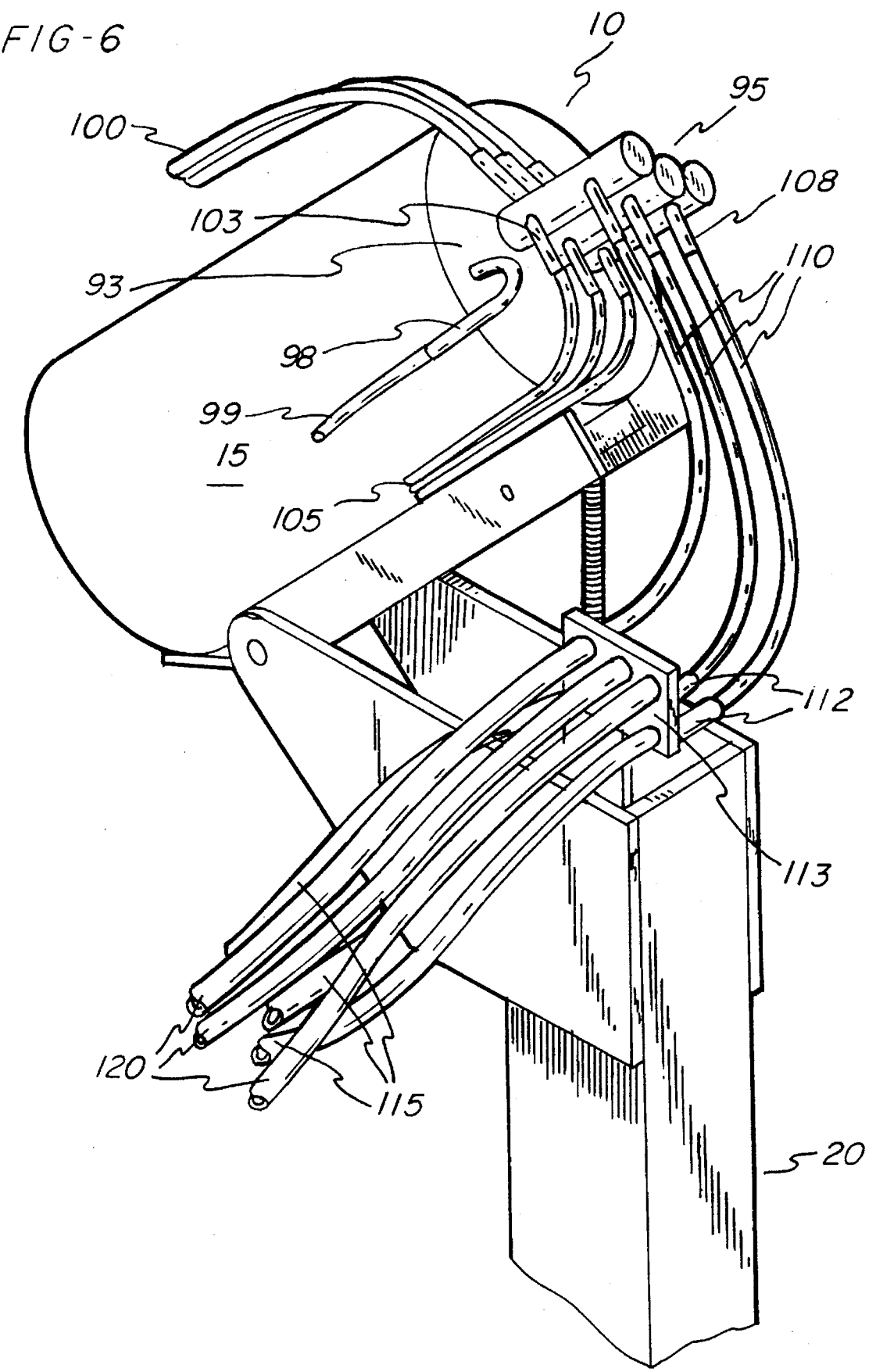

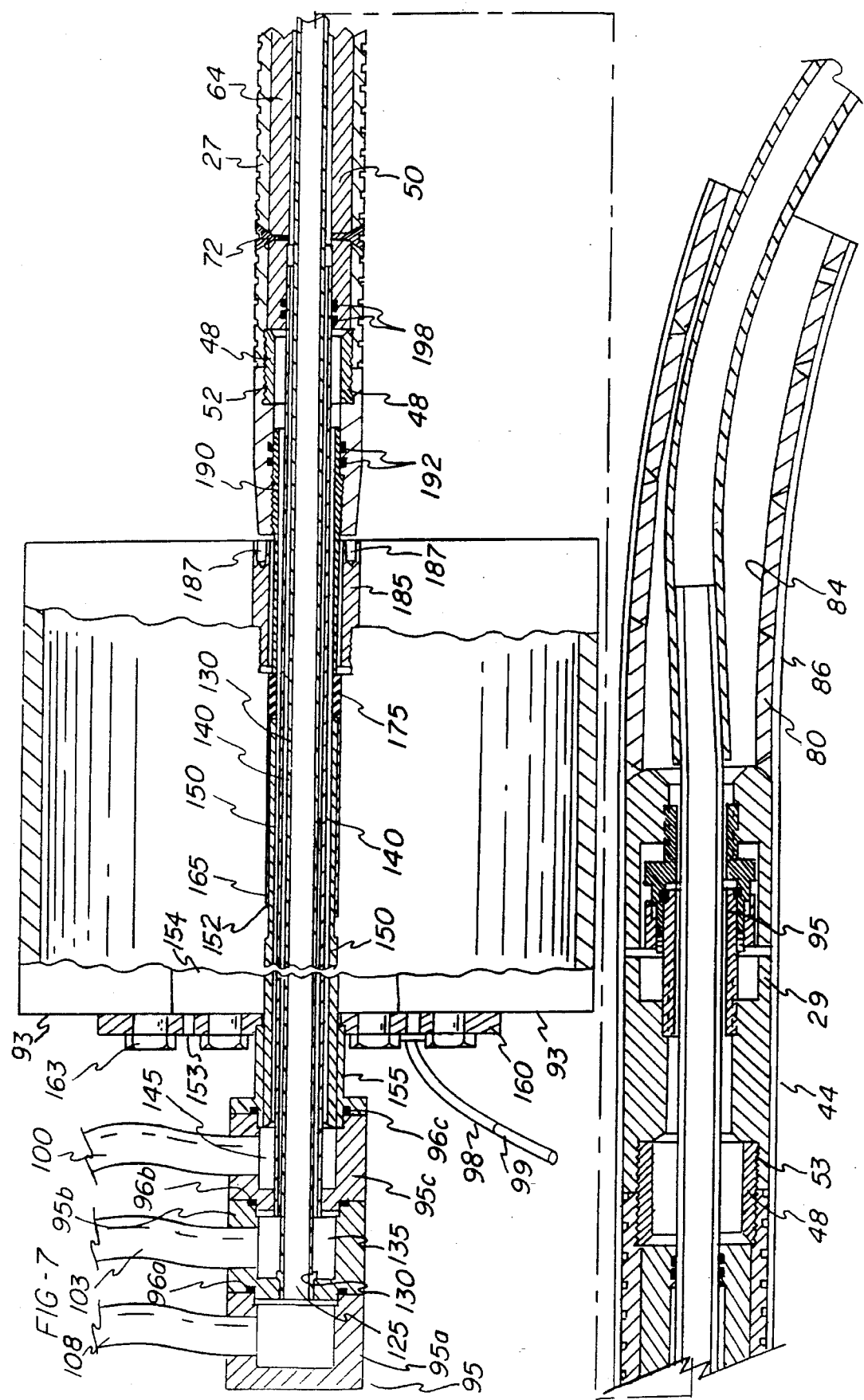

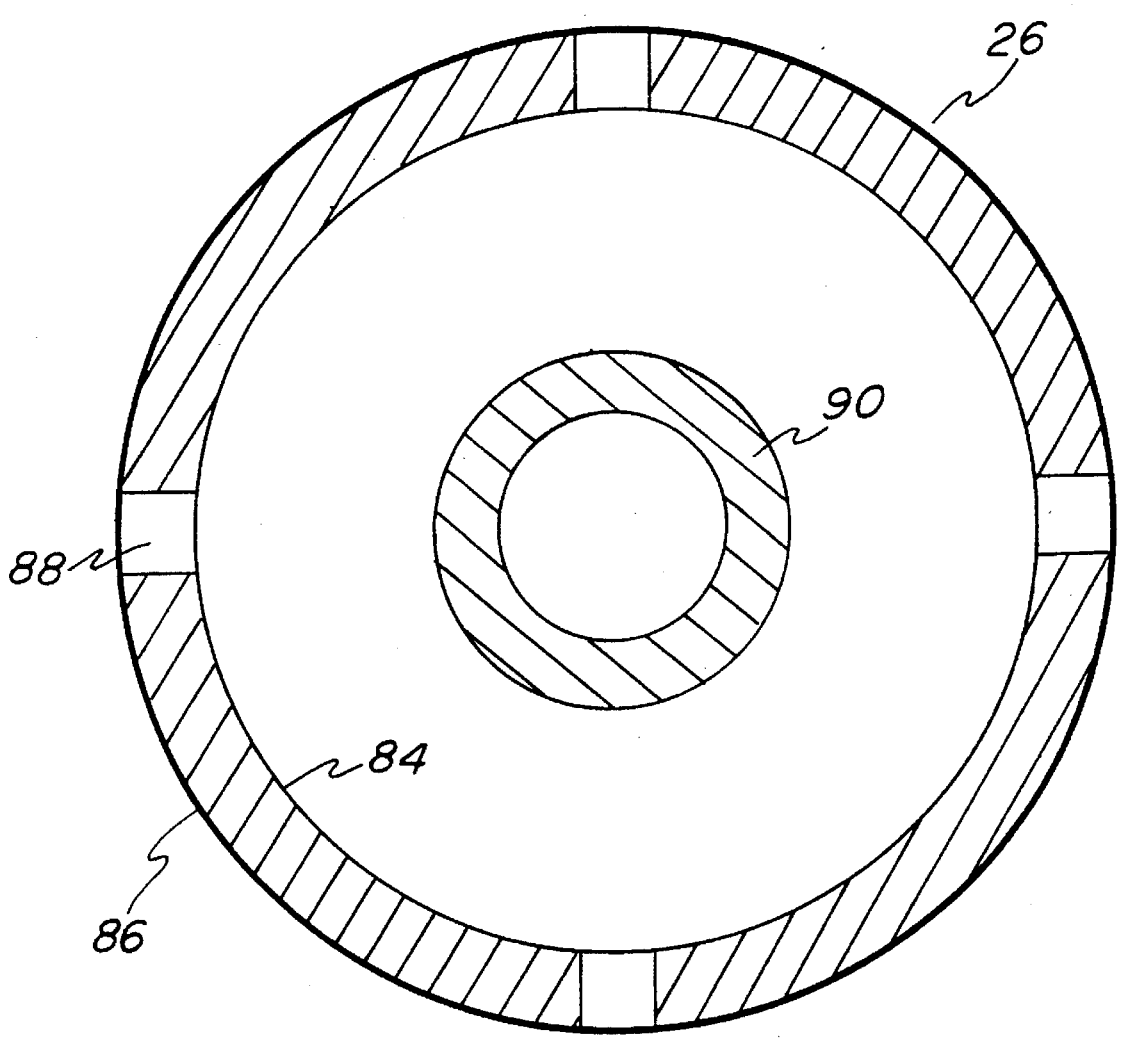

METHOD FOR FORMING A PIPE

BACKGROUND OF THE INVENTION

This invention relates generally to a method for forming extruded plastic pipe, and more particularly to a method for forming pipe of an improved construction.

Plastic pipe has found a variety of uses especially relating to drainage. One of the concerns in the manufacture of plastic pipe is the amount of raw materials consumed and the resultant weight of the finished product. For example, 48" interior diameter solid wall plastic pipe weighs approximately 200 lbs per foot. It has recently been discovered that plastic pipe having apertures formed therein, when the pipe is viewed in cross-section, weighs approximately 30 lbs per linear foot. However, a problem exists in manufacturing pipe having the desired cross-section.

In general, extruded plastic pipe is formed on a production line having a variety of specific machines incorporated into the manufacturing process. One of the first machines is an extruder. Plastic powder, or more preferably pellets, is fed through the extruder where it is subjected to high temperatures such that the plastic melts. The plasticized plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers or bullets which assist in maintaining the desired cross-sectional form which has been extruded. These calibration fingers are part of a manifold assembly. The rest of the manifold assembly extends from above the die as well as beyond the calibration fingers. In addition to the extruder and die, which is supported on a die post assembly, plastic pipe is manufactured using a former or forming head.

The prior art of pipe manufacture has been unable to fabricate plastic pipe which, in addition to being aesthetically pleasing, has a cross-section which incorporates apertures. Although patents have disclosed inventions in pipe having apertures incorporated therein when the pipe is viewed in cross-section, as a practical matter the pipe has apparently been unable to have been manufactured. Instead, upon flowing through the die head, the hot plastic collapses upon the apertures intended to be formed therein. Additionally, another problem in trying to manufacture plastic pipe having such a cross-section is that the hot plastic has tended to clog as it exits the die head and starts to flow over the bullets. It is thus apparent that the need exists for a method for manufacturing an aesthetically pleasing product having the desired cross-section.

SUMMARY OF THE INVENTION

The problems associated with prior methods of manufacture of plastic pipe are overcome in accordance with the present invention by a method for manufacturing plastic pipe such that the pipe has apertures formed therein when the pipe is viewed in cross-section, comprising the steps of having hot plastic flow through a die and subsequently be extruded through a die head to form an extruded wall component having first and second end walls, with the die head having formed therein a plurality of first sized gaps and a plurality of second sized gaps, with the second sized gaps having an aperture located inside each of said second sized gaps. The die is secured to a manifold assembly, with the manifold assembly comprising sets of tubes located centrally of one another, each set of tubes comprising a water inlet tube, a tube through which a vacuum is pulled, and a water return tube. Each set of tubes is positioned longitudinally within a respective die manifold tube with the outermost surface of each set of tubes spaced a first distance from the respective die manifold tube. Each of the respective die manifold tubes extends through the die.

Another step is having air at a pressure in the range of 1–2 ounces flow through the die head apertures in the same direction as the plastic is being extruded. Still another step is having the plastic extruded over at least two calibration fingers which are secured to the die, each of the calibration fingers having a proximal portion adjacent the die head. The proximal portion of each of the calibration fingers is spaced a second distance from the die head. Each of the calibration fingers has a first section with an outer surface, with the first section having: 1) at least one water receiving channel connected to the water inlet tube; 2) a channel connected to the tube through which a vacuum is pulled; and 3) a water return tube positioned centrally of said first section outer surface.

The first section has formed therein apertures connected to the channel connected to the tube through which a vacuum is pulled. Each of the calibration fingers has a calibration finger second section having an outer surface and an interior channel, with the second section having a water return tube positioned centrally of the second section outer surface. The distal end of the water return tube extends beyond the distal end of the second section, with the second section having formed therein apertures connected to the interior channel.

An additional step is having water flow through the water receiving channel in a first direction. The water flows through the first section and into the second section and thence through the second section apertures onto the outer surface of each of the calibration finger second sections so as to flow between the second section outer surface and the extruded plastic.

Another step is having a vacuum pulled through the respective tubes and channels in the manifold assembly, with the vacuum pulling the extruded plastic down upon the outer surface of the first section of each of the calibration fingers. Yet another step is having the water rising to a level within the extruded plastic, which height of water is above the distal end of the water return tube such that the water flows into the water return tube and flows through the manifold assembly in a second direction.

The method also comprises the additional step of winding the extruded wall component, until the first wall is adjacent the second wall and is fused thereto. The method also comprises the step of venting the manifold assembly to atmosphere. The method also comprises the additional step of applying water to the outer surface of the plastic after it is extruded.

There is also disclosed a method for forming wound plastic pipe having an improved construction comprising the steps of extruding plastic through a die head onto a plurality of calibration fingers, with each of the calibration fingers having flowing therethrough water in both a first and a second direction, and a pulled vacuum. The plastic when extruded forming a wall component having first and second end walls and a plurality of cavities of a first and second size, simultaneously causing air to flow through the die head and into the cavities of the second size.

An additional step has a vacuum pulled through each of the calibration fingers, with channels formed in each calibration finger which extend to the outer surface of each calibration finger. The vacuum pulls the extruded plastic down upon the outer surface of the calibration finger.

Another step has water flowing in the first direction flow through apertures in the calibration fingers and flow between each calibration finger outer surface and the extruded plastic to cool the extruded plastic. Still another step includes winding the extruded wall component until the first end wall is directly adjacent the second end wall. The first end wall is then fused thereto. Thereafter water is applied to the outer surface of the plastic after it is extruded. The above method also includes the step of venting said manifold assembly to atmosphere.

It is the primary object of the present invention to provide an improved method for manufacture of pipe having an improved construction.

Other objects and advantages of the invention will be apparent from the following description, the accompanying drawings, and the appended claims.

BRIEF DESCRIPTION OF THE DRAWINGS

FIG. 3 is a side elevational view of the centermost calibration finger first section associated with the method of the present invention.

FIG. 4 is a side elevational view of the intermediate tube which in the preferred embodiment of the invention is formed and then inserted within the calibration finger first section shown in FIG. 3.

FIG. 6 is a perspective view on a greatly enlarged scale taken from the top of the die of FIG. 1.

FIG. 7 is a vertical cross-sectional view on an enlarged scale taken along line 7—7 of FIG. 2.

FIG. 8 is a vertical cross-sectional view on a greatly enlarged scale taken along line 8—8 of FIG. 1.

DETAILED DESCRIPTION OF THE INVENTION

Figure 1:
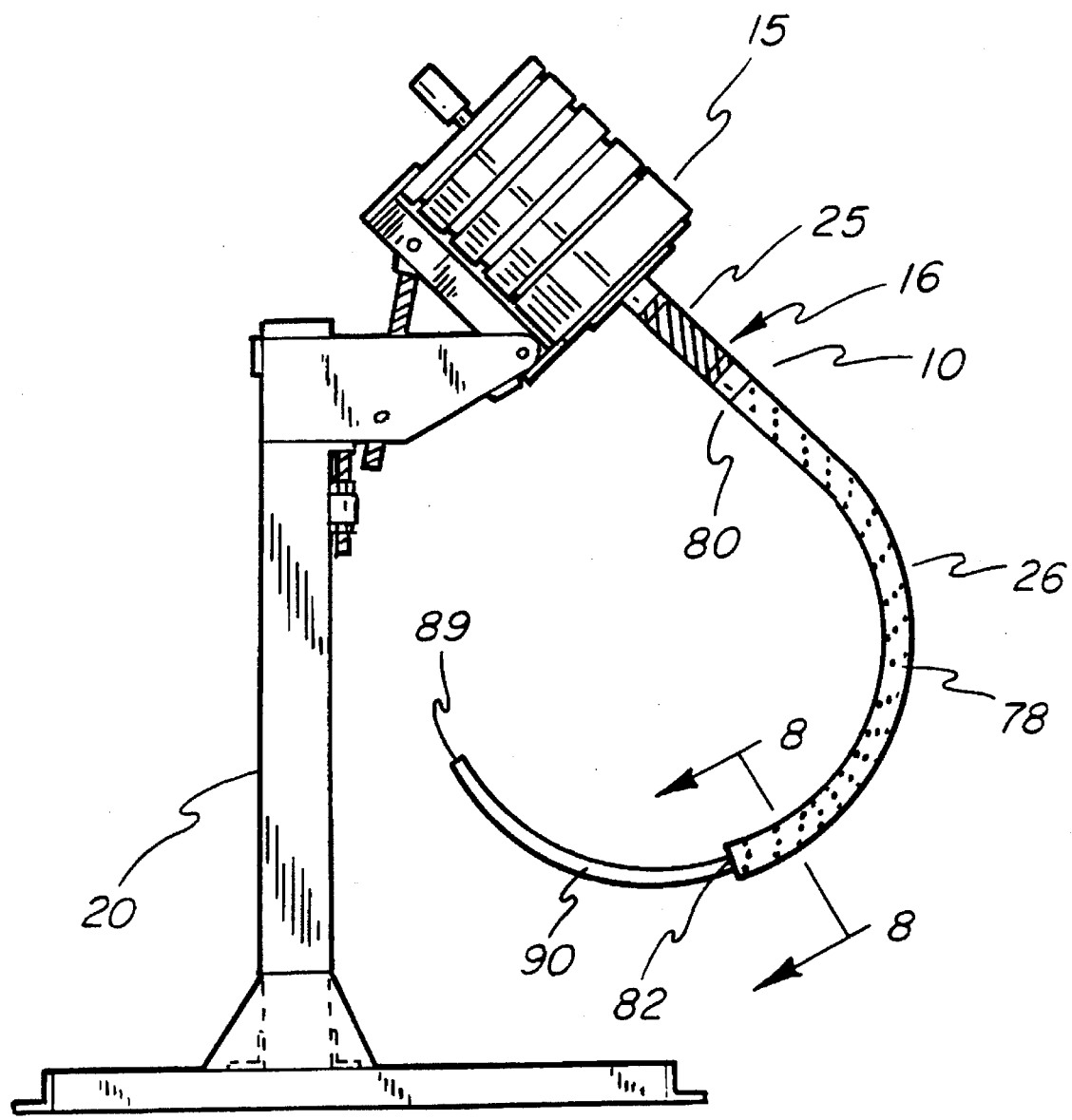
FIG. 1 is a side view of a die and die post assembly with a manifold assembly secured thereto in an operative position for use in accordance with the method of the present invention.

Having reference to the drawings, attention is directed first to FIG. 1 which discloses the manifold assembly associated with the method of this present invention generally disclosed by the numeral 10. The manifold assembly extends through die 15. Drum shaped die 15 having first and second ends is supported on a die post assembly 20. The die and die post are of the type found in plastic extrusion manufacture. The preferred embodiment of this invention utilizes a side fed spiral feed die, although it could use a side fed spider die. Similarly, the improved manifold calibration fingers 16 are located where bullets or calibration fingers of the prior art have been located, namely, at the second end of the die where the plastic is extruded therefrom.

Figure 2:
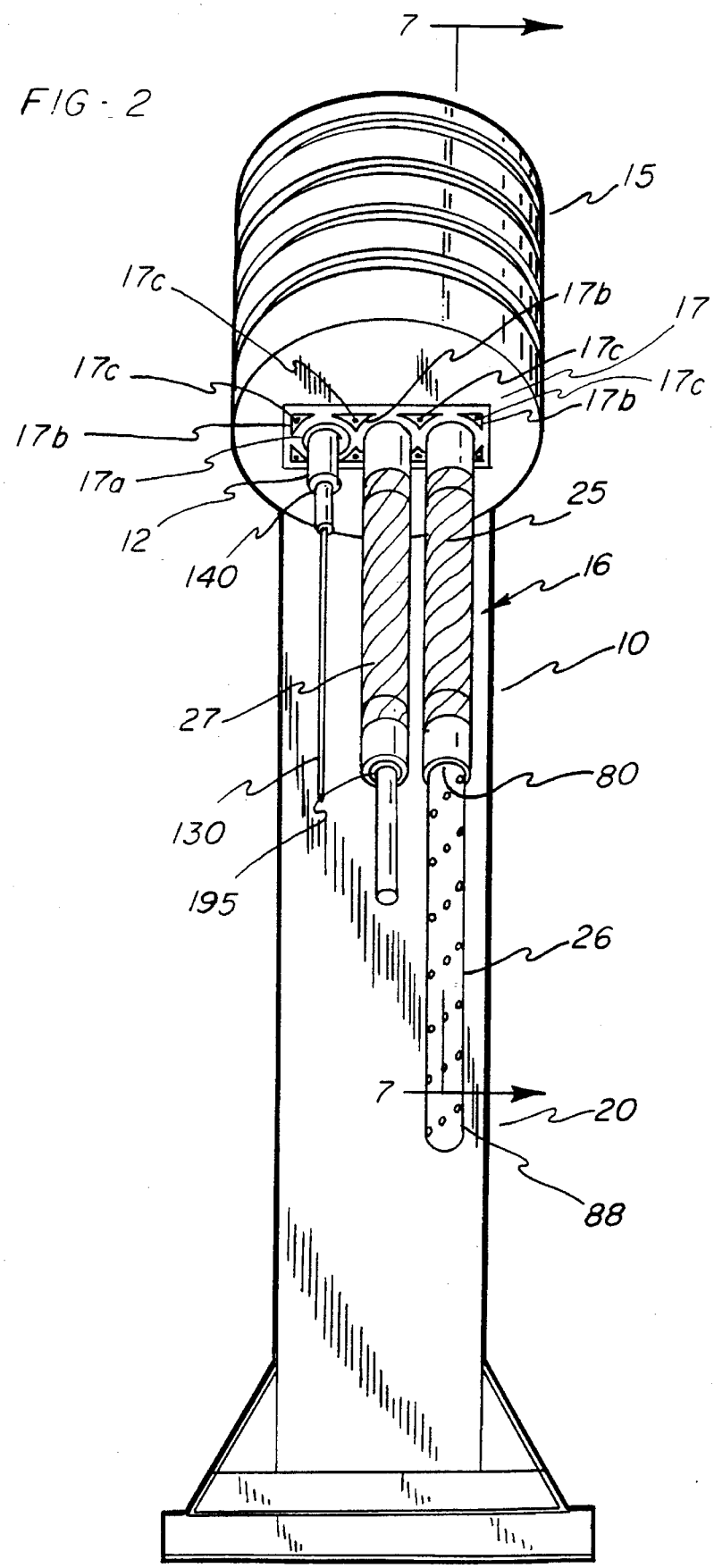
FIG. 2 is a front elevational view of a die and die post assembly in which the die will extrude the wall of a plastic pipe having apertures formed therein, specifically 8 small generally triangular shaped apertures as well as 3 larger generally circular shaped apertures.

This spatial relationship can better be appreciated from consideration of FIG. 2 which discloses the presence of a die head 17. Die heads are well known in the conventional extrusion art. However, this particular die head discloses the presence of 8 small triangular sections and 3 larger circular sections. The circular sections or gaps are of a first size, and the generally triangular section or gaps are of a second size. Both types of die gaps may also be referred to as die openings or die cuts.

During the extrusion of the pipe wall, the plastic flows through the die head through these gaps or sections 17a and 17b respectively. Additionally, it will be noted that air vents 17c are located near the center of each of the triangular shapes. The die head and calibrating fingers cooperate to form the extrusion of a pipe wall component having a plurality of apertures formed therein when the pipe wall is viewed in cross-section.

Extending through the die and die head 17 is a portion of the die manifold assembly 10 to which the calibration fingers are physically secured. This portion of the die manifold assembly 10 is shown at the left-most side of the die head 17 and extends some distance from the drum-shaped die, as will be discussed below.

At the right-most side of the die head 17 is the calibration finger 16 associated with manifold 10 shown in its complete assembly, as can be appreciated from a comparison with FIG. 1. The calibration finger 16 associated with the method of this invention is formed having a first section 25 and a second section 26. The first section or tubular member 25 is shown secured by itself to the portion of the die manifold assembly 10 used in the method of this invention, which portion passes through the die 15 at the center portion of the die head 17 in FIG. 2.

The first tubular member 25 is formed in the preferred embodiment of the invention having a tubular outer shell 27. As can be better appreciated from a comparison of FIGS. 2 with FIGS. 3, 5 and 7, the tubular outer shell 27 has a first end as well as a second end, 28 and 29 respectively. Additionally, the outer shell 27 is formed having an outer surface 30 with this outer surface 30 having formed therein a first radial groove 33 formed in the first radial groove are a plurality of first section apertures 35. Additionally, a second radial groove 37 is formed having a plurality of second section apertures 39 formed therein.

The tubular outer shell is preferably formed having a first finger end 40, a finger shell 42, and a second finger end 44. These three pieces are components of the tubular outer shell and are secured to each other by respective brass connecting rings 48. Each connecting ring 48 is merely a ring with a threaded outer surface which engages with a portion of the inner surface of the finger shell 42. A threaded portion of the inner surface of first finger end 40 also engages with the connecting ring 48, with that first finger end inner surface being 52. A threaded portion of the inner surface of second finger end 44 also engages with the connecting ring 48, with that second finger end inner surface being 53. It will be appreciated from FIG. 3 that, the first finger end is tapered towards the die head. This permits an easier initial flow of the heated plastic over the calibration finger 16 as the plastic exits the die head 17.

In addition to first radial groove 33 and second radial groove 37, the outer surface 30 of tubular outer shell 27 also preferably has formed therein a spiral groove 55. It should also be appreciated that the spiral groove intersects with both the first radial groove and the second radial groove. It will also be appreciated from a comparison of FIGS. 3 and 5 that the outer shell of the first section 25 of the centralmost set, of tubes is preferably formed having two relatively flat surface portions 60 and two curved surface portions 62, whereas the outer two sets of tubes have a flat surface only with respect to their inner side wall as can be seen in FIGS. 5A and 5B respectively.

Figure 5:
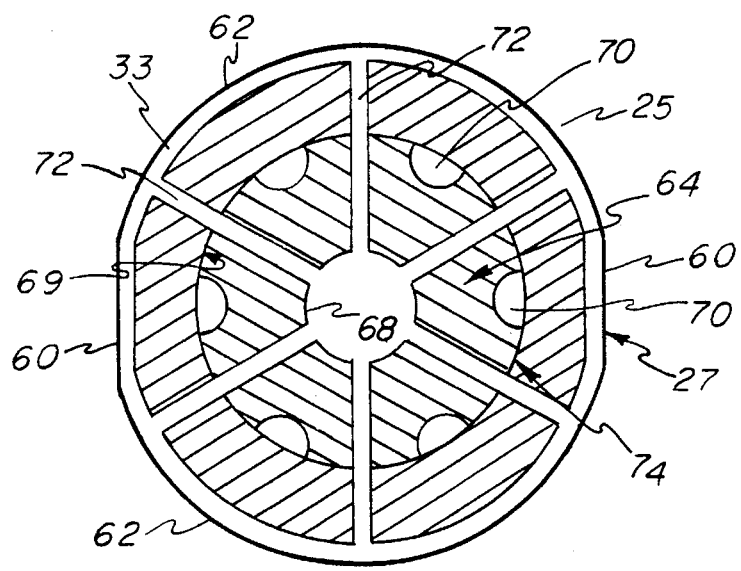
FIG. 5 is a vertical sectional view taken on a greatly enlarged scale along line 5—5 of FIG. 3, however, this particular view shows the calibration finger first section as assembled, thereby disclosing both the outer shell as well as the presence of the intermediate tube.
Figure 5A:
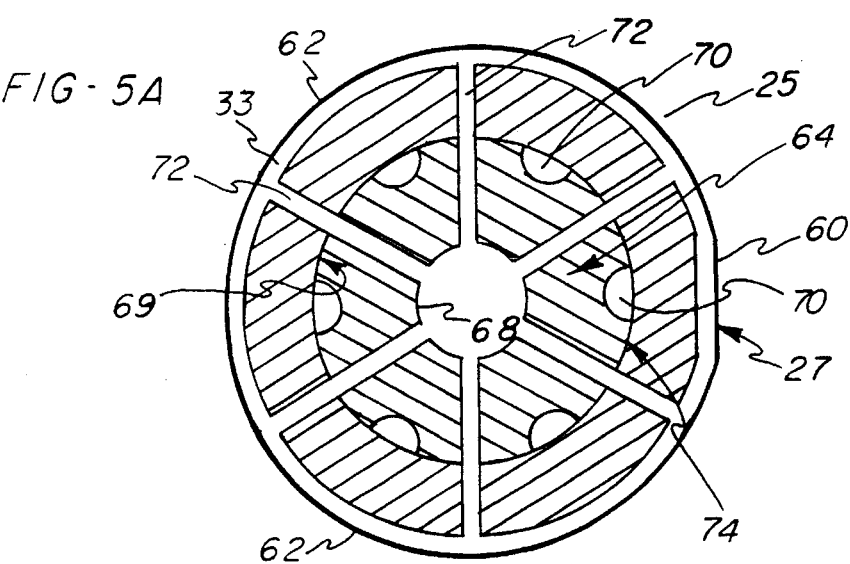
FIG. 5A is a vertical sectional view taken on a greatly enlarged scale and similar to FIG. 5, however, this particular view shows one of the endmost calibration finger first section as assembled.
Figure 5B:
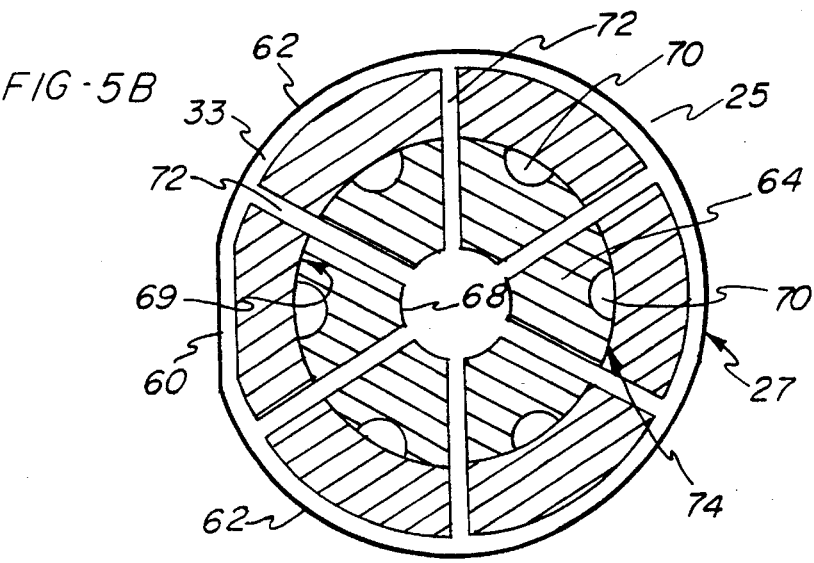
FIG. 5B is a vertical sectional view taken on a greatly enlarged scale and similar to FIGS. 5 and 5A, however, this particular view shows the other endmost calibration finger first section as assembled.

The intermediate tube 64 shown in FIG. 4 also has a first end 65 and a second end 66, and an inner surface 68 as can be appreciated from FIG. 5 as well as an outer surface 69 as can be appreciated from both FIGS. 4 and 5. A plurality of generally longitudinally extending channels 70 are formed in the outer surface 69 of intermediate tube 64. In the pipe wall formed using the method of this invention, there are six such water receiving channels 70.

As stated above, FIG. 5 shows a vertical cross-sectional view on a greatly enlarged scale wherein the intermediate tube is positioned so as to be encircled by the tubular outer shell 27. As such, the various water receiving channels 70 may be seen to become enclosed such that they permit the passage of water in a first direction through the die and towards the second section. Preferably the flow taste is 4–5 gallons of water per minute per each set of tubes. Additionally, the presence of the cool water in the six channels helps to cool the tubular outer shell in the presence of the hot plastic.

As can also be seen in FIG. 5, the first tubular member 25 also has a plurality of radially extending channels 72 which extend from the inner surface 68 of intermediate tube 64 to the apertures in either radial groove 32 or 37. As will be discussed below, the inner surfaces 64 of the intermediate tube 64 help to define a channel through which a vacuum is pulled.

In actual assembly of the first tubular member, the tubular outer shell has the intermediate tube placed therein, then the appropriate holes are drilled through both the tubular outer shell and the intermediate tube. First, the tubular outer shell and intermediate tube are welded, with the inner surface of the outer shell 27 being welded to the outer surface 69. Once the two components are stabilized and a 3/32" diameter hole is drilled, a 3/32" outer diameter aluminum tube with a 1/16" hole is press fit into the 3/32" hole until it reaches the inner surface 68. This process is repeated until the desired number of channels exist, which as stated above with reference to FIG. 5 is six. The tops of the tubes can be filed off and each respective radially extending channel 72 sealed in place with an appropriate sealant. Preferably the radial groove is placed on the outer shell after the aforementioned welding and drilling have occurred, but before the insertion of the tubes which make the radially extending channel 72. The finger shell 42 is approximately 18" long in the preferred embodiment of the invention and has an outer diameter of approximately 2½". Preferably the center of the first radial groove is 2½" from the junction of the finger first end and finger shell. Meanwhile, the second radial groove is approximately 1 9/16" from the junction of the second finger end and finger shell. The spiral groove is 3/32" wide and has a 1" pitch double lead over the entire 18". Similarly, the radial grooves are 3/32". Furthermore, the various longitudinally extending channels 70 are formed having a radius of 5/16". Further, each of the slots are formed being ¼" from the high point of the radius. The intermediate tube is approximately 16½" long and has an outer diameter such that it fits the inner diameter of the outer shell. Preferably both the outer shell and the intermediate tube are fabricated from aluminum.

As can be appreciated from a comparison of FIGS. 1, 2, 7 and 8 the second tubular member 26, also fabricated of aluminum, comprises a first end 80 and a second end 82 as well as an inner surface 84 and an outer surface 86. The longitudinal shape of the second tubular member 26 corresponds to the shape of the plastic product to be produced. Where as here the fabrication system is designed to produce circular plastic pipe, the longitudinal shape of the second section 26 is curved. As can be appreciated in the drawings, the second tubular member 26 also has a plurality of apertures 88 formed therein with these apertures extending between the inner surface 84 and the outer surface 86 of the second tubular member 26. Thus it can be appreciated that the second end of the tubular outer shell 27 of the first tubular member 25 is attached to the curved member first end 80.

It should also be appreciated that the first tubular member is of a first length and the second tubular member is of a second length with this second length being longer than the first length. For example, in the embodiment of the invention discussed herein, the second tubular member measures 42" in length, with the first 3" being straight. Specifically it should also be appreciated that the diameter of the curved member apertures are greater than the diameter of the first member apertures, primarily because the curved member apertures facilitate the flow of water therethrough while the first member apertures are used to facilitate the pulling of a vacuum. The vacuum assists in stabilizing the shape of the plastic as it is extruded.

The portion of the die manifold assembly 10 secured to die 15 can best be appreciated from a comparison of FIGS. 6 and 7. As can be appreciated from those drawing figures, the die head first end or rear face 93 has secured thereto a rear manifold tube housing 95, with this securing preferably accomplished by four screws. In actual fabrication this rear manifold tube housing comprises three components 95a, 95b, and 95c respectively. It will also be appreciated that manifold tube housing O-rings 96a, 96b, and 96c are positioned adjacent the corresponding rear manifold tube housing component.

A TEFLON insulative tube 98 connects the interior of the die at the die head rear face 93 with a low pressure air inlet line 99. The air which enters the die through this line is ultimately emitted through apertures 17c in the die head and help to cool the plastic triangular walls as well as to exert outward pressure on the plastic to support the cavity and consequently prevent its collapse. The pressure is approximately 1–2 ounces.

Still further, a water inlet line, with one tube for each manifold calibration finger is secured to the rear manifold tube housing. This water inlet line 100 permits cool water to be introduced into the manifold assembly.

A rear vacuum pipe 103 extends from the rear manifold tube housing 95 and connects to a, rear vacuum line 105. Once again it will be appreciated that the number of rear vacuum pipes 103 and hence the number of rear vacuum lines 105 correspond to the number of calibration fingers 16. A water expulsion pipe 108 also extends from the rear manifold tube housing 95 with each water expulsion pipe 108 being connected to the water expulsion outlet line first section 110. While the rear vacuum pipe and water expulsion pipe are preferably formed of metal, the rear vacuum line as well as the water expulsion outlet line first section are of plastic composition.

Each of the water expulsion outlet line first sections 110 connect to a water ejector 112. It has been found that a well ejector package sold by Teel Water Systems as a heavy duty shallow well ejector works quite well to facilitate the removal of water through the manifold following its circulation therethrough. The various water ejectors 112 are secured to a water ejector mounting plate 113 which is part of the die post assembly 20. To facilitate the operation of the water ejector 112, respective water expulsion inlet lines 115 are secured at the water ejector mounting plate to be secured to the water ejector 112. Similarly, respective water expulsion outlet line second sections 120 are secured at the water ejector mounting plate to the water ejector. In actual operation, the flow of water through the water expulsion inlet lines 115 into the water ejectors 112 creates a venturi effect which results in the formation of a vacuum which in turn draws the water through the respective water expulsion line first sections and thereafter forceably expels water through the water expulsion outlet line second section 120.

Yet a better appreciation of the inner workings of the improved die manifold assembly 10 associated with the method of this invention can be appreciated from consideration of FIG. 7 which shows a water expulsion port 125 through which the water passes as it is drawn through the calibration finger and secured manifold assembly and then flows through the water expulsion outlet line first sections. The water enters the water expulsion port 125 from the inner manifold tube 130 which is connected to the proximal end 92 of the second component 90.

It will also be appreciated that within rear manifold tube housing component 95b is a vacuum port 135. The rear manifold tube housing component 95b is preferably welded to vacuum tube 140. Similarly, rear manifold tube housing 95c is preferably welded to outer manifold tube 150. Meanwhile rear manifold tube housing component 95a is preferably screwed onto inner manifold tube. The distal end of the vacuum tube 140 is held frictional engagement by the inner surface 68 of the intermediate tube 64 of first section 25. When the second component 90 is frictionally secured to the distal end of the inner manifold tube 130, the rear vacuum line and rear vacuum pipe 103 permit a vacuum to draw inwardly through the apertures in the radial grooves. Each of inner manifold tube 130, vacuum tube 140 and outer manifold tube 150 is preferably fabricated from stainless steel.

Also shown is a water inlet port 145 through which the water enters the rear manifold tube housing 95c through water inlet line 100. The water thus flows through respective outer manifold tubes 150. A housing connector 155 secures the rear manifold tube housing to a manifold mounting plate 160 which in turn is secured to the die head first end or rear face 93 by appropriate fasteners 163.

Thus, as die manifold tube 165 extends through the die itself, it has therein the outer manifold tube 150 through which cool water is flowing in a first direction, vacuum tube 140 through which a vacuum is being pulled in the opposite direction to the flow of the cool water, and inner manifold tube 130 through which warm water is also being pulled in that second direction thereafter exiting through the water expulsion lines. The outermost surface of each set of tubes 150, 140, and 130 respectively, that being in the preferred embodiment of the invention the outer surface of tube 150, is spaced a first distance from the respective die manifold tube. Within die manifold tube 165 is a preferably hex shaped structure 175 which is placed so as to aid in the support and stabilization of the outer manifold tube 150. It also minimizes the transfer of heat between the cooler tubes and the warmer ones. This hex shaped structure 175 can be appreciated as being positioned adjacent mandrel extension tube 185 of the die, which mandrel extension tube in turn is secured at the front face of the die head at die head apertures 187, which are preferably spanner wrench holes. Mandrel extension Lube is screw threaded into a mandrel extension component of the die, with the mandrel extension of the type known in the art. The space between the inner surface of the die manifold tube 165 and the exterior surface of outer manifold tube 150 forms a venting channel 152. Thus the method of this invention has the manifold assembly vented to atmosphere by the cooperation of venting channel 152, venting channel outlet 153 and enclosed common airspace 154. Preferably the venting channel outlet is just a single aperture in the first end of the die, even though there would be three venting channels as in the embodiment of the manifold assembly shown in the drawings. Meanwhile, the plurality of venting channels associated with each of the sets of tubes preferably converge near the rear interior of the die so as to form a single enclosed common airspace. More preferably, this enclosed common airspace is directly adjacent, the venting channel outlet.

It can be appreciated from consideration of FIG. 7 that proximal tip 40 and die head 17 are spaced apart a second distance. Thus, the venting to atmosphere extends from the approximate ⅛" space between the proximal tip 40 and the die head 17 to the first end of said die with the portion of the venting channel between the die manifold tube and the outermost surface of each set of tubes being only about 1/16".

In actual assembly, the die is assembled so as to encompass the portion of the manifold assembly shown and discussed above with respect to FIG. 7. When finished it resembles the left-most portion of the die head as seen in FIG. 2. The first section 25 is then slid over the secured die manifold assembly 10. The first finger threads 190 are then secured to the threaded terminal corresponding terminal end of the outer die manifold tube. Helping to maintain a good seal are a first pair of O-rings 192 placed within appropriate grooves on the first finger end inner surface 52 as shown in FIG. 7. The first tubular member then is positioned as shown in the middle of die head 17. The second tubular member at its first end 80 has a quick release female mechanism of the type well known in pipe art. In the preferred embodiment of the invention this quick release mechanism is a 1" brass, straight through flow valve manufactured by Parker-Hanifin, which mechanism joins with the quick release male mechanism 195 positioned at the second end 66 of the intermediate tube 64. Thus, when used in combination to form three circular apertures through a pipe wall when viewed in cross-section, the flat sections 60 on each of the calibration fingers are parallel to a flat section on an adjacent calibration finger. A second pair of O-rings 198 are found in appropriate grooves on the inner surface 68.

In connection with the actual practice of the method of this invention, the presence of the atmospheric vent is extremely important. Initially the machine did not utilize this feature and the hot plastic, in effect, was sucked down into the space between the proximal end of the calibration finger and the die head where it clogged the extrusion operation. The addition of the atmospheric vent more than remedied the situation. Instead of clogging, the plastic easily flowed over the outer surfaces of the calibration fingers.

Further, in actual use the cooling water passes through the water inlet tube 150 and the water receiving channels 70 within each manifold calibration finger while a vacuum is pulled through the middle manifold tube 140 and through the radially extending channels 72 in the first section. Still further, water flows from the water receiving channels into the second section 26 and thereafter through the apertures 88 in the second tubular member onto the outer surface 86 of such calibration finger. The water thus flows between the outer surface of the second section and the extruded plastic which surrounds the calibration finger when the plastic is being extruded so as to cool the extruded plastic pipe. The water is deposited within the cavity of the extruded plastic.

Eventually the water level within the cavity reaches the distal tip 89 of the flexible tube 90 where it is slicked back through the interior of this second component 90, through the second component's juncture with the first component 130 preferably within the second section 26, through the water return tube or first component 130 encircled by the die, and finally through the respective tube connecting the water return tube outlet with the water ejector 112.

The method of this invention also has the plastic wall component wound about a machine known as a former until the first end wall of the wall component is directly adjacent the second end wall of the wall component. After the wall component exits the diehead, a water cooled side wall guide, preferably fabricated from aluminum and secured to the former, stabilizes the first end wall by cooling it. A ceramic heater attached to the die post assembly heats, or more accurately reheats, the second end wall. The adjacent wall components then have their respective end walls fused together. As the end walls fuse together, preferably three TEFLON rollers roll the seam down. To further assist in the cooling of the plastic pipe as it winds around the former, the method includes the additional step of applying water to the outer surface of the now tubular plastic pipe. Preferably at least one cloth, and more preferably two, draped onto the pipe acts to spread the water out onto the pipe's surface to effectuate cooling. Also preferably a last cloth is draped over the pipe to assist in drying the pipe surface.

It will be readily apparent from the foregoing detailed description of the method of this invention that a particularly novel and extremely unique method for forming plastic pipe of an improved construction is provided. While the method described herein constitutes the preferred embodiment of the invention, it is to be understood that the invention is not limited to this precise method and that changes may be made therein without departing from the scope of the invention which is defined in the appended claims.

What is claimed is:

1. A method for forming plastic pipe having an improved construction comprising the steps of:

having hot plastic flow through a die and subsequently be extruded through a die head to form an extruded wall component having first and second end walls, said die head having formed therein a plurality of first sized gaps and a plurality of second sized gaps said second sized gaps having an aperture located inside each of said second sized gaps, said die secured to a manifold assembly, said manifold assembly comprising sets of tubes located centrally of one another, each set of tubes comprising a water inlet tube, a tube through which a vacuum is pulled, and a water return tube, each said set positioned longitudinally within a respective die manifold tube with the outermost surface of each said set of tubes spaced a first distance from said respective die manifold tube, each of said respective die manifold tubes extending through the die, having air at a pressure in the range of 1–2 ounces flow through the die head apertures in the same direction as the plastic is being extruded, having the plastic extruded over at least two calibration fingers which are secured to the die, each of said calibration fingers having a proximal portion adjacent said die head, said proximal portion of each of said calibration fingers being spaced a second distance from said die head, each of said calibration fingers having a first section having an outer surface, said first section having: 1) at least one water receiving channel connected to said water inlet tube; 2) a channel connected to said tube through which a vacuum is pulled; and 3) said water return tube positioned centrally of said first section outer surface, said first section having formed therein apertures connected to said channel connected to said tube through which a vacuum is pulled, each of said calibration fingers having a calibration finger second section having an outer surface and an interior channel, said second section having said water return tube positioned centrally of said second section outer surface with the distal end of said water return tube extending beyond the distal end of said second section, said second section having formed therein apertures connected to said interior channel, having water flow through the water receiving channel in a first direction, said water flowing through said first section and into said second section and thence through said second section apertures onto the outer surface of each of said calibration finger second sections so as to flow between said second section outer surface and said extruded plastic, having a vacuum pulled through the respective tubes and channels in the manifold assembly, said vacuum pulling the extruded plastic down upon the outer surface of the first section of each of the calibration fingers, and having said water rise to a level within said extruded plastic that is above the distal end of the water return tube such that said water flows into the water return tube and flows through said manifold assembly in a second direction.

2. The method according to claim 1 which includes the step of venting said manifold assembly to atmosphere.

3. A method for forming wound plastic pipe having an improved construction comprising the steps of extruding plastic through a die head onto a plurality of calibration fingers, each of said calibration fingers having flowing therethrough water in both a first and a second direction, and a pulled vacuum, the plastic when extruded forming a wall component having a first and second end walls and a plurality of cavities of a first and second size, simultaneously causing air to flow through said die head and into the cavities of said second size, having a vacuum pulled through each of the calibration fingers with channels formed in each calibration finger which extend to the outer surface of each calibration finger, said vacuum pulling the extruded plastic down upon the outer surface of the calibration finger, and having the water which flows in the first direction flow through apertures in the calibration fingers and flow between each calibration finger outer surface and the extruded plastic to cool the extruded plastic.

4. The method according to claim 3 which includes the step of venting said manifold assembly to atmosphere.

* * * * *